United States Patent [19]

Tetenes

[11] Patent Number: 4,903,429
[45] Date of Patent: Feb. 27, 1990

[54] DEVICE TO ATTRACT FISH

[76] Inventor: John Tetenes, 155 S. Ketcham Ave., Amityville, N.Y. 11701

[21] Appl. No.: 222,050

[22] Filed: Jul. 21, 1988

[51] Int. Cl.⁴ ............... A01K 97/00; A01K 97/02; A01K 97/04

[52] U.S. Cl. ............................ 43/44.99; 43/55; 43/56

[58] Field of Search ............... 43/41, 44.99, 55, 56

[56] References Cited

U.S. PATENT DOCUMENTS

| | | | |
|---|---|---|---|
| 2,241,314 | 5/1941 | Mohler | 43/55 |
| 2,580,879 | 1/1952 | Belokin, Jr. | 43/56 |
| 2,600,826 | 6/1952 | Allen | 43/56 |
| 3,499,526 | 3/1970 | Willinger | 43/44.99 |
| 3,717,124 | 2/1973 | Jacobs | 43/55 |
| 3,974,591 | 8/1976 | Ray | 43/44.99 |
| 4,570,374 | 2/1986 | Baxley | 43/55 |

Primary Examiner—Nicholas P. Godici
Assistant Examiner—William Scott Andes
Attorney, Agent, or Firm—Michael I. Kroll

[57] ABSTRACT

A device to attract fish is provided and consists of a bucket held within a net suspended downwardly from a float into a body of water. The bucket holds frozen fish chum so that open top of the bucket is at right distance below water line allowing pieces of defrosted fish chum to be dispensed from the bucket and float on the water to attract the fish.

6 Claims, 1 Drawing Sheet

DEVICE TO ATTRACT FISH

BACKGROUND OF THE INVENTION

1. Field of the Invention

The instant invention relates generally to fishing tackle and more specifically it relates to a device to attract fish by dispensing fish chum therefrom.

2. Description of the Prior Art

Numerous fishing tackle have been provided in prior art that are adapted to be used in catching fish. The fishing tackle can be various types of rods, reels, lures and fishhooks. While these units may be suitable for the particular purpose to which they address, they would not be as suitable for the purposes of the present invention as heretofore described.

SUMMARY OF THE INVENTION

A primary object of the present invention is to provide a device to attract fish that will overcome the shortcomings of the prior art devices.

Another object is to provide a device to attract fish that will hold frozen fish chum in a body of water and will dispense pieces of defrosted fish chum therefrom to attract fish, such as sharks and the like.

An additional object is to provide a device to attract fish in which a bucket holding the frozen fish chum is suspended downwardly from a float into the body of water so that open top of the bucket is just below the water line allowing the defrosted fish chum to come out of the bucket and float on the water to attract the fish.

A further object is to provide a device to attract fish that is simple and easy to use.

A still further object is to provide a device to attract fish that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
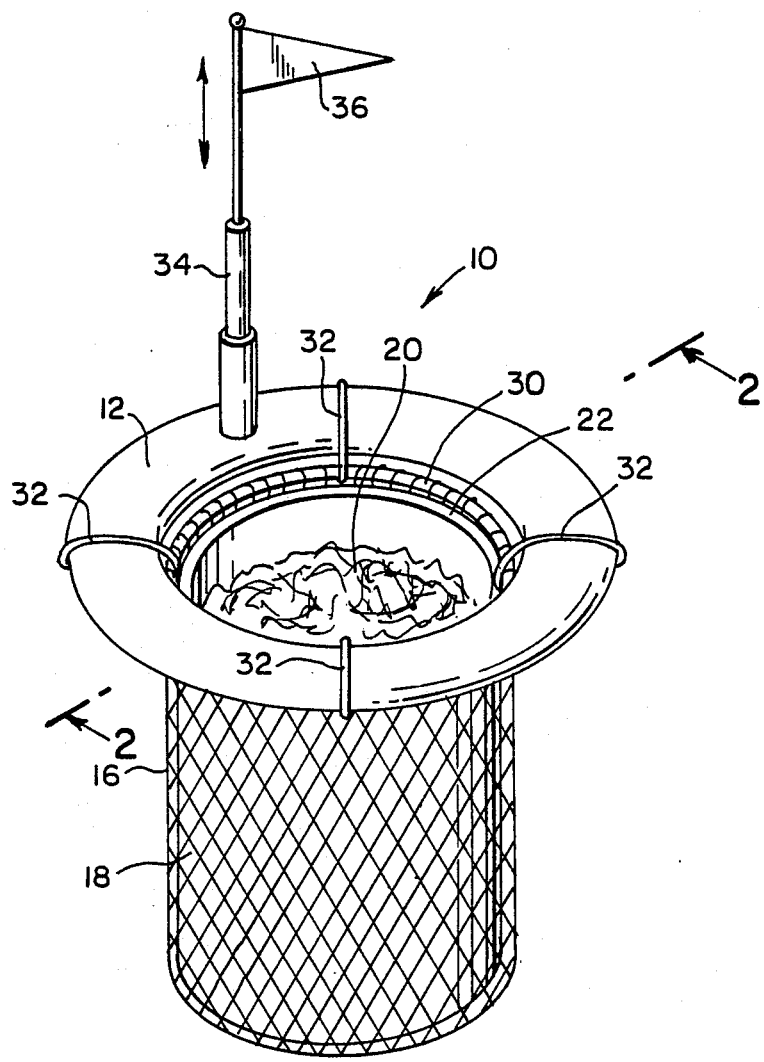
FIG. 1 is a perspective view of the invention.
Figure 2:
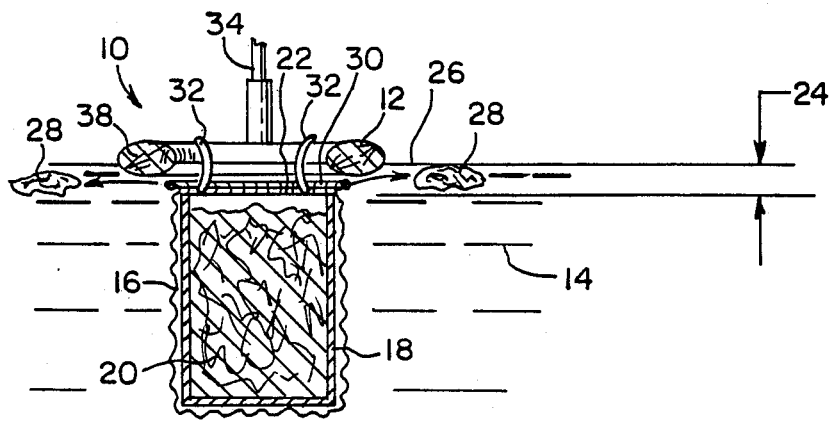
FIG. 2 is a cross sectional view taken along line 2—2 in FIG. 1, showing the invention in a body of water.

Turning now descriptively to the drawings, in which similar reference characters denote similar elements throughout the several views, FIGS. 1 and 2 illustrate a device 10 to attract fish consisting of a float 12 in shape of a lifesaver disposed onto a body of water 14. A net 16 is suspended downwardly from the float 12 into the water 14, while a bucket 18 is held within the net 16. The bucket 18 holds frozen fish chum 20 therein, so that open top 22 of the bucket 18 is at right distance 24 below water line 26 allowing pieces of defrosted fish chum 28 to be dispensed from the bucket 18 and float on the water 14 to attract the fish, such as sharks or the like.

A ring member 30 is connected to top of the net 16, while a plurality of tie cords 32 are provided for attaching the ring member 30 to the float 12 so that the top of the net 16 will always be kept open allowing the bucket 18 to be easily placed therein.

A telescopic rod 34 is connected to the float 12, while a flat 36 is affixed to top of the telescopic rod 34, so that the device 10 can be located at a distance when placed into the water 14.

Figure 3:
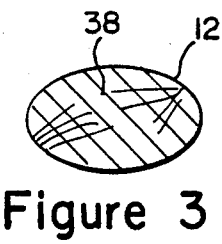
FIG. 3 is an enlarged cross sectional view taken through the float showing an oval configuration.
Figure 4:
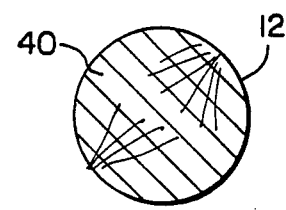
FIG. 4 is an enlarged cross sectional view taken through the float showing a round configuration.
Figure 5:
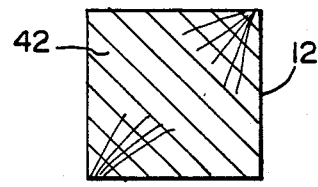
FIG. 5 is an enlarged cross sectional view taken through the float showing a square configuration.

As shown in FIG. 3, the cross section of the float 11 is in an oval configuration 38. In FIG. 4 the cross section of the float 12 is in a round configuration 40. In FIG. 5, the cross section of the float 12 is in a square configuration 42. Other types of cross section configurations (not shown) of the float 12 can be utilized in the device 10 as long as the float 12 is in the shape of a lifesaver to suspend the net 16 therefrom.

It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device to attract fish which comprises:
   (a) a float in shape of a lifesaver disposed onto a body of water;
   (b) a net suspended downwardly from said float into the water; and
   (c) a bucket held within said net, said bucket holds frozen fish chum therein, so that open top of said bucket is at right distance below water line allowing pieces of defrosted fish chum to be dispensed from said bucket and float on the water to attract the fish.

2. A device as recited in claim 1, further comprising:
   (a) a ring member connected to top of said net; and
   (b) a plurality of tie cords attaching said ring member to said float so that the top of said net will always be kept open allowing said bucket to be easily placed therein.

3. A device as recited in claim 2, further comprising:
   (a) a telescopic rod connected to said float; and
   (b) a flat affixed to top of said telescopic rod so that said device can be located at a distance when placed into the water.

4. A device as recited in claim 3, wherein cross section of said float is in an oval configuration.

5. A device as recited in claim 3, wherein cross section of said float is in a round configuration.

6. A device as recited in claim 3, wherein cross section of said float is in a square configuration.

* * * * *